United States Patent
Mühlleitner

(10) Patent No.: US 6,852,940 B1
(45) Date of Patent: Feb. 8, 2005

(54) WELDING DEVICE

(75) Inventor: Heinz Mühlleitner, St. Pölten Flinsbach (AT)

(73) Assignee: Franz Plasser Bahnbaumaschinen-Industriegesellschaft m.b.H., Vienna (AT)

( * ) Notice: Subject to any disclaimer, the term of this patent is extended or adjusted under 35 U.S.C. 154(b) by 0 days.

(21) Appl. No.: 10/835,227

(22) Filed: Apr. 29, 2004

Related U.S. Application Data
(60) Provisional application No. 60/549,331, filed on Mar. 2, 2004.

(30) Foreign Application Priority Data

Feb. 23, 2004  (AT) ..................... GM129/2004

(51) Int. Cl.[7] .............................. B23K 11/00
(52) U.S. Cl. ......................... 219/55; 104/15
(58) Field of Search .............. 219/53, 54, 55; 104/15

(56) References Cited

U.S. PATENT DOCUMENTS 3,349,216 A   10/1967   Paton et al.
6,163,003 A  * 12/2000   Battisti .................. 219/55

FOREIGN PATENT DOCUMENTS

EP   0 132 227 B1   1/1985
GB   2 185 703 A    7/1987

OTHER PUBLICATIONS

Alfred Wöhnhart et al.: "Mobile flash–butt rail welding: three decades of experience", *Rail Engineering International Edition*, 2002, No. 3, pp. 11–16.

* cited by examiner

*Primary Examiner*—Clifford C. Shaw
(74) *Attorney, Agent, or Firm*—Laurence A. Greenberg; Werner H. Stemer; Gregory L. Mayback

(57) ABSTRACT

A welding device for welding together two rails of a track and producing a welded joint is composed of two halves. An air nozzle and a temperature sensor are mounted on one of the halves. Via a cooling opening of the air nozzle, a glowing-cooled hot welded joint can be cooled in a controlled manner, immediately after a welding bead has been sheared off, by supplying compressed air to the joint. Thus, optimal welding of head-hardened rails can be achieved.

13 Claims, 2 Drawing Sheets

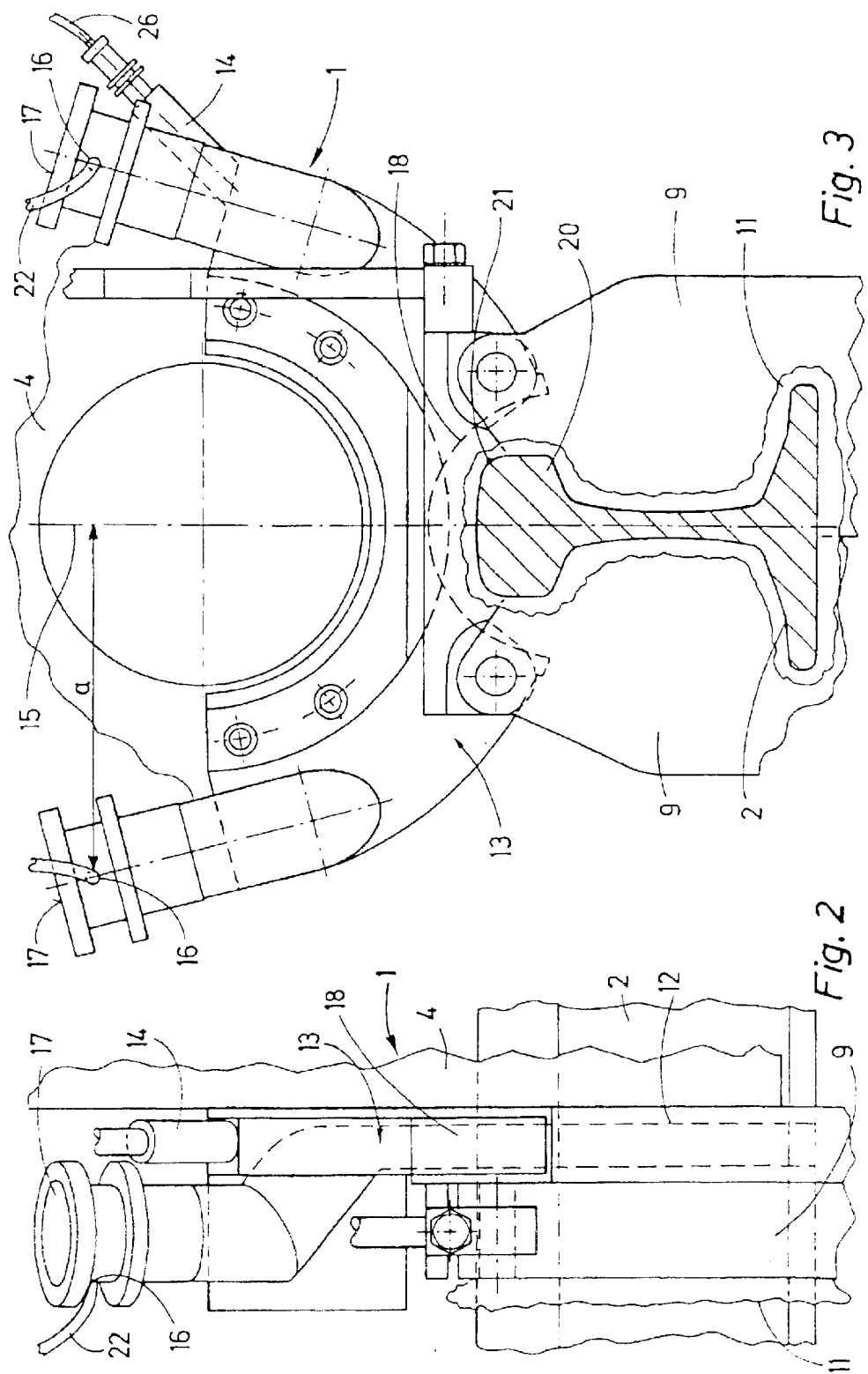

WELDING DEVICE

CROSS-REFERENCE TO RELATED APPLICATION

This application claims the benefit under 35 U.S.C. § 119(e) of copending U.S. Provisional Application No. 60/549,331, filed Mar. 2, 2004; the application also claims the priority, under 35 U.S.C. § 119(a), of Austrian utility model application GM 129/2004, filed Feb. 23, 2004; the prior applications are herewith incorporated by reference in their entirety.

BACKGROUND OF THE INVENTION

Field of the Invention

The present invention relates, in general, to a welding device for welding together two rails of a track, thus producing a welded joint. The rails extend in a longitudinal direction and each rail has a rail head.

Welding devices of this type for carrying out so-called mobile flash-butt welding have become known in various embodiments from a variety of publications, such as, for example, U.S. Pat. No. 3,349,216, European Patent No. 0 132 227 B1, and UK Patent Application GB 2 185 703 A.

According to an article in the technical periodical "Rail Engineering International", Edition 2000, 3, pages 11–16, it is also known to cool a welded joint of head-hardened rails by blowing air at the joint. To that end, a special cooling hood comprising cooling openings is placed over the glowing-hot welded joint after the welding device has been removed, and compressed air is supplied. The disadvantage of cooling in this manner lies in the fact that various essential activities, such as the removal of the welding device, the amount of compressed air supplied, or the duration of the cooling process, depend upon the skill and reliability of the operating personnel.

SUMMARY OF THE INVENTION

It is accordingly an object of the invention to provide a welding device, which overcomes the above-mentioned disadvantages of the heretofore-known devices and methods of this general type and which allows welding of head-hardened rails to be carried out in an optimal manner.

With the foregoing and other objects in view there is provided, in accordance with the invention, a welding device for welding together two rails of a track, thus producing a welded joint, the rails extending in a longitudinal direction and each rail having a rail head. The welding device comprises two halves of the device which are movable in the longitudinal direction, each half of the device comprising clamping jaws provided for engaging a respective one of the rails, and hydraulic compression cylinders for moving the two halves of the device in the longitudinal direction. A shearing knife is provided for removing a welding bead from the welded joint. An air nozzle is mounted on one of the halves of the device and comprises a temperature sensor, and a control unit for controlling the welding operation is configured for supplying compressed air to the air nozzle.

With the foregoing and other objects in view there is also provided, in accordance with the invention, a method of welding together two rails of a track by means of a welding device, in which the rails are heated with controlled supply of electric current and are subsequently pressed against one another with high pressure, thus forming a welded joint with a welding bead. The novel method includes the steps of: placing an air nozzle having a cooling opening over the glowing-hot welded joint immediately after removal of the welding bead from the welded joint; measuring the temperature of the welded joint; after the welded joint reaches a critical starting temperature, supplying compressed air automatically to the air nozzle along with ambient air aspirated in as a result of the inflow of the compressed air into the air nozzle; automatically stopping the supply of compressed air after the welded joint reaches a critical cooling temperature; and lifting the welding device from the welded rails.

Preferably, the following parameters are registered and recorded during the cooling phase: a starting temperature, the cooling temperature, a duration of supplying compressed air, and a temperature curve. In accordance with a further preferred mode of operation, the supply of compressed air to the cooling opening via the air nozzle is controlled such that the welded joint is cooled at a steady rate.

A solution of this kind offers the advantage that it is now possible, immediately after removal of the welding bead, to cool the welded joint in a controlled manner which can be reproduced with equal quality at any time. In connection with the temperature sensor, the cooling operation can take place precisely within the most favorable temperature range, while the control unit provides the possibility of regulating the supply of air in order to achieve a steady cooling process with optimal hardening of the rail head.

Other features which are considered as characteristic for the invention are set forth in the appended claims.

For example, in accordance with an added feature of the invention, the air nozzle and the temperature sensor are disposed between the two halves of the device.

In accordance with an additional feature of the invention, the air nozzle is mounted on the shearing knife.

In accordance with another feature of the invention, the control unit is configured for inputting a starting temperature for automatically starting a supply of air to the air nozzle in dependence on a temperature of the welded joint detectable by the temperature sensor. In addition, or alternatively, the control unit is configured for input of a stopping temperature for automatically stopping a supply of air to the air nozzle in dependence upon a temperature of the welded joint detectable by the temperature sensor.

In accordance with a further feature of the invention, the control unit is configured for controlling a supply of compressed air to the air nozzle in dependence upon a temperature of the welded joint as detectable by the temperature sensor.

In accordance with again an added feature of the invention, the air nozzle is formed with a cooling opening positionable immediately above the rail head at the welded joint, with a compressed air opening connected to a compressed air line, and with a suction port for an intake of ambient air. In a preferred embodiment, there are provided two compressed air openings and two suction ports associated with the air nozzle. In that case, the two compressed air openings or suction ports are disposed in each case, relative to a transverse direction extending perpendicularly to the longitudinal direction, at an equal distance from a plane of symmetry of the rail.

In accordance with another preferred embodiment of the invention, the compressed air opening is disposed underneath the suction port, and a cross-section of the suction port is greater, by a factor of at least three, than a cross-section of the compressed air opening.

In accordance with a concomitant feature of the invention, the temperature sensor is an infrared pyrometer configured for contactless measurement of a temperature of a measurement locus, positioned on the rail head, of the welded joint.

Although the invention is illustrated and described herein as embodied in a welding device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a diagrammatic and partly perspective enlarged side view of an air nozzle of the welding device; and FIG. 3 is an enlarged view of the air nozzle according to the invention in a longitudinal direction of the rails.

DESCRIPTION OF THE PREFERRED EMBODIMENTS

Figure 1:
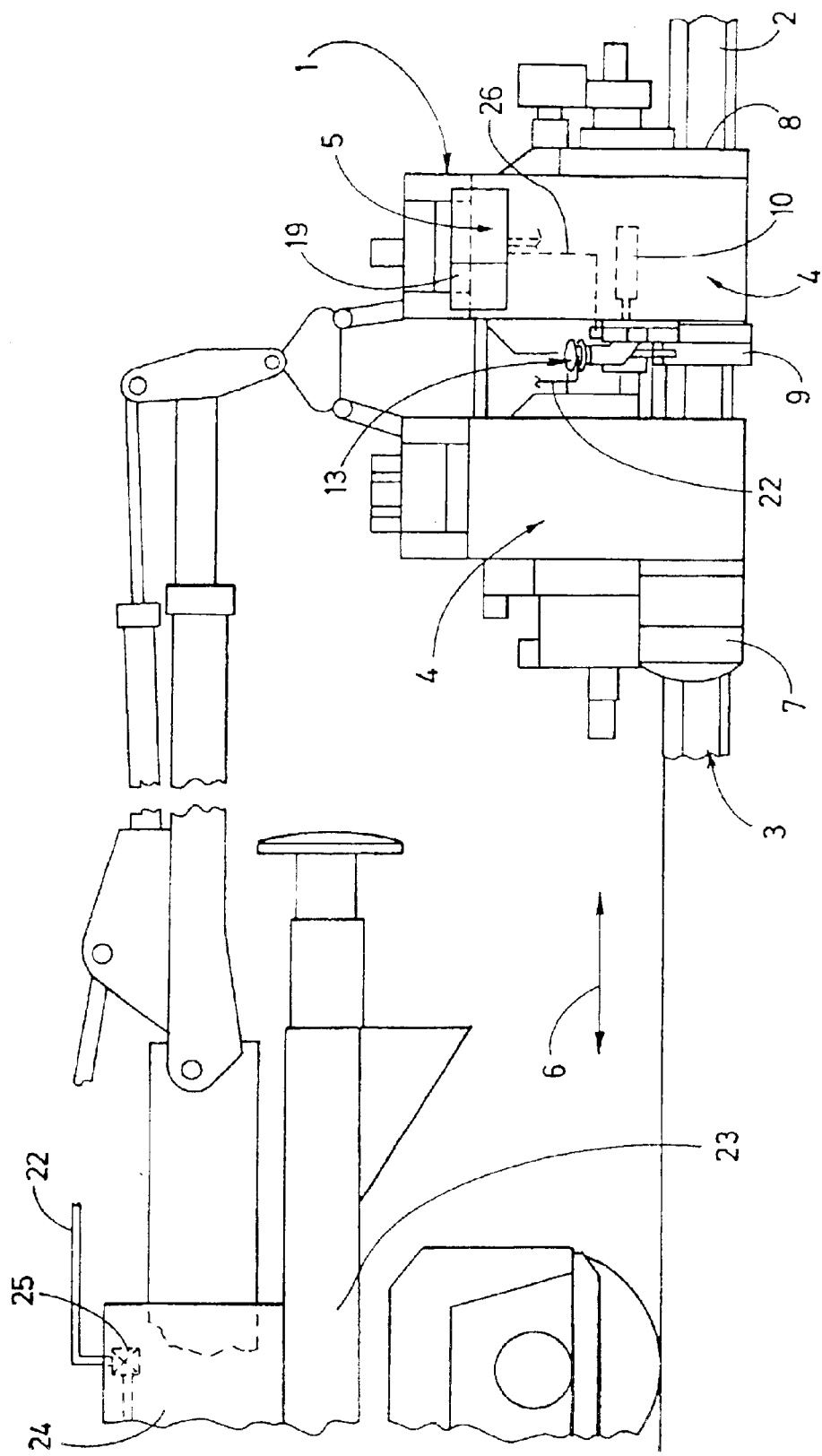
FIG. 1 is a side elevational view of a welding device and a partially illustrated welding machine.

Referring now to the figures of the drawing in detail and first, particularly, to FIG. 1 thereof, there is shown a mobile welding device 1 which is configured for carrying out electrical flash-butt welding operations on rails 2 of a track 3, extending in a longitudinal direction as indicated by double-arrow 6. Each rail 2 has a rail head 20. Energy is supplied to the welding device 1 from a welding machine 23 mobile on the track 3. The welding device 1 primarily consists of two halves 4, 4 and a control unit 5 for controlling the welding operation. The two halves 4 of the welding device 1 are connected to one another, and are displaceable with regard to one another, by way of hydraulic compression cylinders 7 which extend in the longitudinal direction 6.

Each half 4 of the welding device 1 comprises a pair of clamping jaws 8. The jaws 8 are disposed in opposite relationship to one another perpendicularly to the longitudinal direction and they are configured for engaging a respective one of the rails 2 for carrying out the welding operation. Provided between the two halves 4, 4 of the device 1 is a shearing knife 9 which is displaceable in the longitudinal direction 6—relative to the two halves 4 of the device—by way of a drive 10 for the purpose of shearing a welding bead 11 from a welded joint 12 (see FIG. 2).

As can be seen in more detail now also in FIGS. 2 and 3, an air nozzle 13 including a temperature sensor 14 is fastened directly to the shearing knife 9. The control unit 5 is configured for supplying compressed air to the air nozzle 13 when the temperature of the welded joint 12 lies within a certain, selectable temperature range. Associated with the air nozzle 13 are two compressed air openings 16 and two suction ports 17, these being arranged in each case, with respect to a transverse direction extending perpendicularly to the longitudinal direction 6, at an equal distance a from a plane of symmetry 15 of the rail 2. Each compressed air opening 16 is arranged underneath the associated suction port 17, with a cross-section of the suction port 17 being larger, by at least a factor of three, than a cross-section of the compressed air opening 16.

The temperature sensor 14 is designed as an infrared pyrometer for contact-less measurement of the temperature of a measuring point 21 of the welded joint 12 positioned on the rail head 20. A compressed air line 22 is connected to the compressed air opening 16 and also to an air compressor installation 24 located on the welding machine 23. The air compressor installation 24 contains a valve 25, actuatable by the control unit 5, for controlling the supply of compressed air.

The control unit 5 is configured for inputting a starting temperature and a stopping temperature, at which temperature the air supply via the compressed air lines 22 is automatically started and stopped, respectively. To that end, the temperature sensor 14 is connected to the control unit 5 via a conduit 26. Additionally, the control unit 5 is equipped with a storage memory 19 for registering and recording the following parameters: starting temperature, cooling temperature, duration of supplying compressed air, and temperature curve during the cooling phase.

The mode of function of the welding device will now be described in more detail.

For carrying out a welding operation, the welding device 1 is lowered from the welding machine 23 onto the two rails 2 to be connected to one another, and the clamping jaws 8 are applied to the rails 2. While electrical current is supplied, a glowing-hot welded joint 12 is produced in the known manner, including a welding bead 11. The latter is sheared off instantly from the welded joint 12 by moving the shearing knife 9, with the aid of the drive 10, in the longitudinal direction 6 relative to the two halves 4 of the welding device 1, while said halves remain in contact with the rails 2. In the process, the sheared-off welding bead 11 is distanced from the glowing welded joint 12 (see FIG. 2), and the air nozzle 13 mounted on the rear side of the shearing knife 9 is automatically positioned so that its cooling opening 18 lies exactly above the welded joint 12.

After the temperature sensor 14 detects the ideal starting temperature for the cooling phase, the valve 25 is opened with the aid of the control unit 5, causing a controlled supply of dried compressed air (at 6 bar pressure, 1,400 liters/minute) to be fed to the air nozzle 13 via the compressed air lines 22. As a result, ambient air is aspirated into the two suction ports 17 (at the rate of 25,000 liters/minute) and fed via the cooling opening 18 to the welded joint 12 in the region of the rail head 20 for the cooling thereof. As soon as the temperature sensor 14 registers a critical cooling temperature at the measuring point 21, the supply of compressed air is interrupted and the cooling phase is terminated. Thus, a hardening of the welded joint 12 in the region of the rail head 20 is achieved down to a depth of 15 millimeters. Finally, the clamping jaws 8 and the shearing knife 9 are released from the rail 2, and the welding device 1 is lifted in order to be moved to the next welding site.

The starting temperature for initiating the controlled cooling process ought to lie within a range of 800° to 850° C. The critical temperature for terminating the cooling phase should be around 500° C. In this context, it should particularly be born in mind that the latest point in time for initiating the cooling of the welded joint 12 is thirty seconds after finishing the welding. Since these cooling parameters naturally depend upon the kind of rails being welded or the specifications prescribed by the rail manufacturer, it is especially advantageous if various cooling parameters, optimally adapted in each case to a specific type of rail, are stored in the control unit 5 and thus may be called up with the push of a button.

The parameters: starting temperature, cooling temperature, duration of supplying compressed air, and temperature curve are registered and recorded during every cooling operation of a welded joint 12. The amount of compressed air fed to the cooling opening 18 via the air nozzle 13 is regulated automatically in such a way that the cooling of the welded joint 12 progresses at a steady rate (for example 4° C. per second). The control unit 5 allows the welding process to start only when enough compressed air is present in the air compressor installation 24.

What is claimed is:

1. A welding device for welding together rails of a track with a welded joint, the rails extending in a longitudinal direction and each rail having a rail head, the welding device comprising:

two halves each having clamping jaws for engaging a respective one of the rails and being movably disposed in the longitudinal direction;

hydraulic compression cylinders for moving said two halves in the longitudinal direction relative to one another;

a shearing knife for removing a welding bead from the welded joint;

an air nozzle mounted on one of said halves of the device and a temperature sensor; and a control unit for controlling a welding operation connected to said temperature sensor and configured for supplying compressed air to said air nozzle.

2. The welding device according to claim 1, wherein said air nozzle and said temperature sensor are disposed between said two halves of the device.

3. The welding device according to claim 1, wherein said air nozzle is mounted to said shearing knife.

4. The welding device according to claim 1, wherein said control unit is configured for inputting a starting temperature for automatically starting a supply of air to said air nozzle in dependence on a temperature of the welded joint detectable by said temperature sensor.

5. The welding device according to claim 1, wherein said control unit is configured for inputting a stopping temperature for automatically stopping a supply of air to said air nozzle in dependence upon a temperature of the welded joint detectable by said temperature sensor.

6. The welding device according to claim 1, wherein said control unit is configured for controlling a supply of compressed air to said air nozzle in dependence upon a temperature of the welded joint as detectable by said temperature sensor.

7. The welding device according to claim 1, wherein said air nozzle is formed with a cooling opening positionable immediately above the rail head at the welded joint, with a compressed air opening connected to a compressed air line, and with a suction port for an intake of ambient air.

8. The welding device according to claim 7, wherein said compressed air opening is one of two compressed air openings and said suction port is one of two suction ports associated with said air nozzle, and wherein said two compressed air openings or suction ports are disposed in each case, relative to a transverse direction extending perpendicularly to the longitudinal direction, equidistant from a plane of symmetry of said rail.

9. The welding device according to claim 7, wherein said compressed air opening is disposed underneath said suction port, and a cross-section of said suction port is larger, by a factor of at least three, than a cross-section of said compressed air opening.

10. The welding device according to claim 1, wherein said temperature sensor is an infrared pyrometer configured for contactless measurement of a temperature of a measurement locus, positioned on the rail head, of the welded joint.

11. A method of welding together two rails of a track with a welding device, which comprises:

heated heating the rails with a controlled supply of electric current and subsequently pressing the rails against one another for producing a welded joint with a welding bead;

removing the welding bead from the glowing-hot welded joint and immediately thereafter placing an air nozzle formed with a cooling opening over the welded joint;

measuring a temperature of the welded joint;

after the welded joint reaches a critical starting temperature, automatically supplying compressed air to the air nozzle along with ambient air aspirated in as a result of an inflow of the compressed air into the air nozzle;

automatically terminating a supply of compressed air after the welded joint reaches a critical cooling temperature; and lifting the welding device from the welded rails.

12. The method according to claim 11, which comprises registering and recording the following parameters during the cooling phase: a starting temperature, the cooling temperature, a duration of supplying compressed air, and a temperature curve.

13. The method according to claim 11, which comprises controlling the supply of compressed air to the cooling opening via the air nozzle such that the welded joint is cooled at a steady rate.

* * * * *